(No Model.)
A. J. LYONS.
COMBINED HARROW AND SOD CUTTER.
No. 328,898. Patented Oct. 20, 1885.
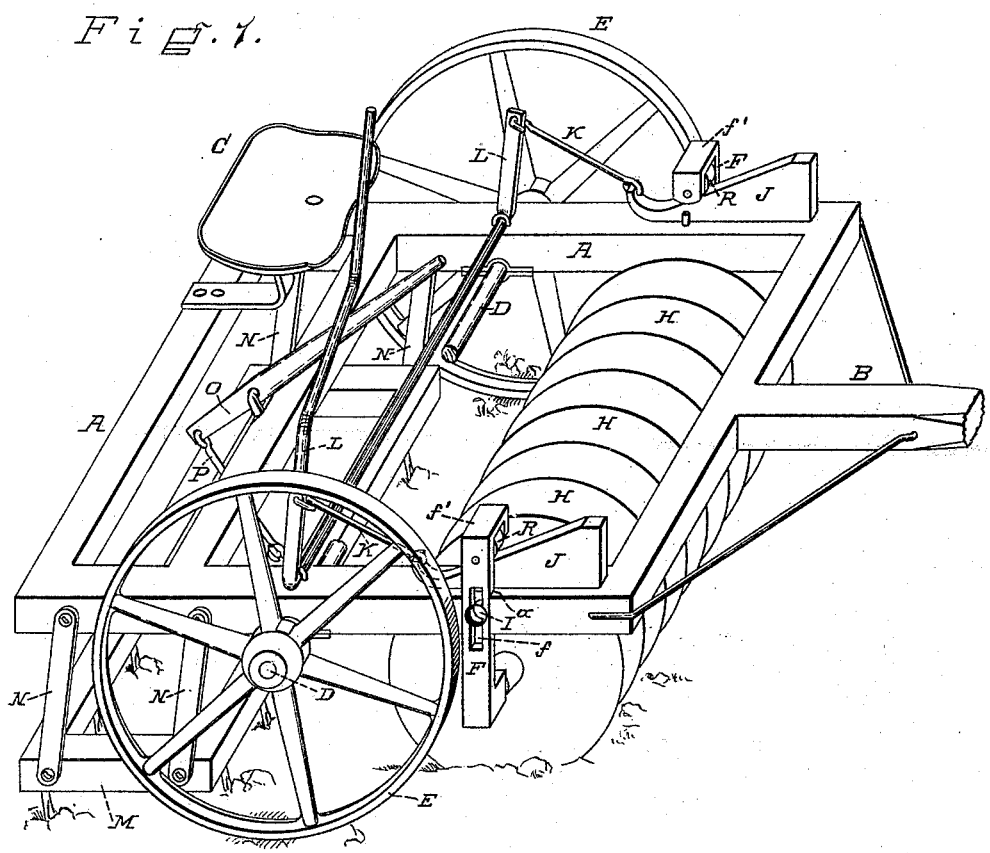
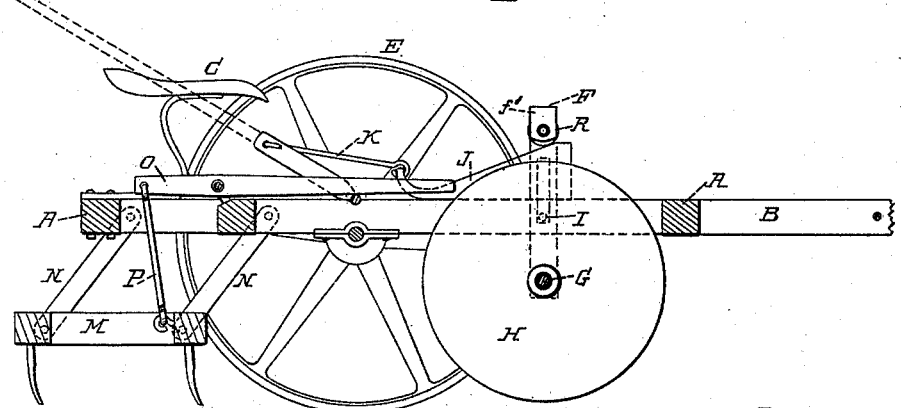
Attest:
A. P. Knight
Geo. L. Wheelock
Inventor:
A. J. Lyons
By Knight Bros.
Attys.

UNITED STATES PATENT OFFICE.

ALBERT J. LYONS, OF PELLVILLE, KENTUCKY.

COMBINED HARROW AND SOD-CUTTER.

SPECIFICATION forming part of Letters Patent No. 328,898, dated October 20, 1885.

Application filed August 17, 1885. Serial No. 174,628. (No model.)

*To all whom it may concern:*

Be it known that I, ALBERT J. LYONS, of Pellville, Hancock county, Kentucky, have invented a new and useful Improvement in a Combined Harrow and Sod-Cutter, of which the following is a specification.

My invention is an improvement in those machines in which a gang or series of cutting-disks in front and a harrow in the rear are both suspended from the same frame. In my said improvement the main frame is supported upon the axle or the ground-wheels and itself supports, first, a series of sod-cutting disks having means of vertical adjustment with respect to the main frame; and, second, a harrow-frame hung from the main frame by links, and capable of being raised by a hand-lever pivoted both to the harrow-frame and the main frame.

In the accompanying drawings, Figure 1 is a perspective view of a combined sod-cutter and harrow embodying my invention. Fig. 2 is a vertical section of the same.

A represents a sulky-frame having suitable draft-pole or tongue, B, and driver's seat C, and being mounted upon axle D of ground-wheels E.

Near the front part of the frame are vertical grooves $a$, for standards F of bent axle F F G, upon which my gang or series of cutting-disks H are loosely sleeved. Slots $f$ in standards F receive bolts I, which retain the standards to the grooves $a$, but which permit their vertical movement therein.

The standards F have lips $f'$, provided with anti-friction rollers R, that rest upon wedges J, that are connected by rods K with duplex lever L, by manipulation of which the driver can draw the wedges J underneath the lips $f'$, and by so doing elevate the gang of disks more or less out of the ground, and by this means regulate the depth of cut, or completely unearth them, when desired.

M is a harrow suspended by links N from the frame A, and having its depth of penetration capable of being regulated at any instant, or susceptible of being completely unearthed by the operator, through the instrumentality of a lever or treadle, O, that is fulcrumed to the frame A, and is connected to the harrow-frame by a link, P.

I claim as new and of my invention—

The combined sod or clod cutter and harrow, consisting of the gang of cutting-disks H upon bent axle F G, occupying grooves $a$ in the sulky-frame A, and resting upon wedges J, connected with a duplex lever, L, located conveniently to the driver's seat, the same being combined with harrow M, suspended by links N from the sulky-frame, and capable of elevation and depression by lever or treadle O, substantially as described.

In testimony of which invention I hereunto set my hand.

ALBERT J. LYONS.

Attest:
R. S. BEVEN,
W. T. OWEN.